March 3, 1942.  H. M. BOLSTON  2,274,881
CLAMP FOR DIE STOCK AND TEMPLATE
Filed Jan. 23, 1941
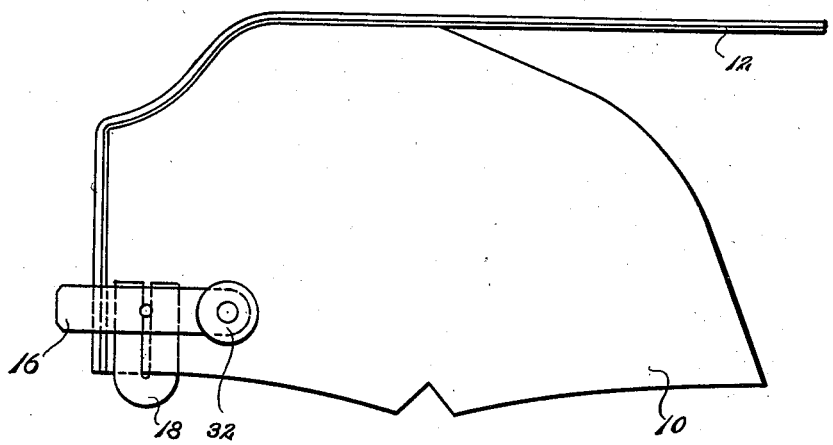
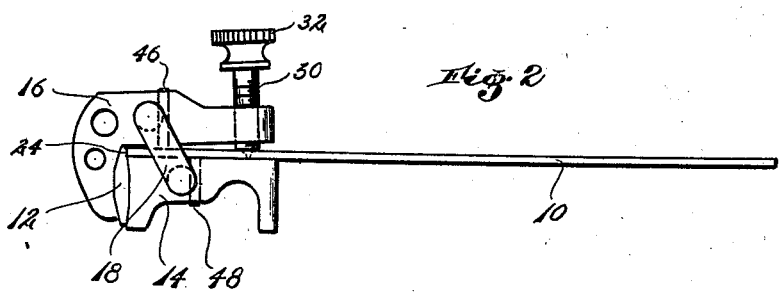
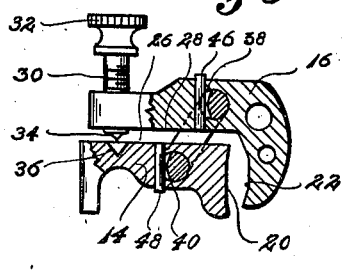
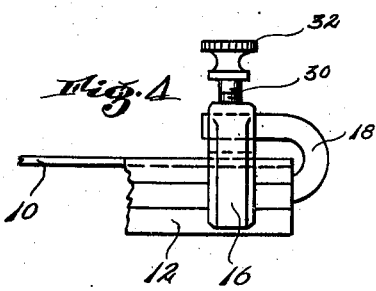
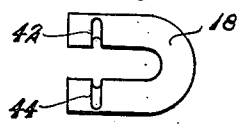
Inventor
HARRY M. BOLSTON
by Thomson & Thomson
his Attys.

Patented Mar. 3, 1942

2,274,881

UNITED STATES PATENT OFFICE 2,274,881

CLAMP FOR DIE STOCK AND TEMPLATE

Harry M. Bolston, Revere, Mass.

Application January 23, 1941, Serial No. 375,572

3 Claims. (Cl. 153—32)

This invention relates to improvements in a clamping device for holding a template and a piece of die stock in association with each other whereby the die stock may be bent to the shape of the template in the manufacture of a cutting die, such dies being known as "clicker" dies principally used in the shoe trade for stamping out parts of shoes.

The present application discloses improvements over the clamping device disclosed in my prior application Serial No. 338,539, filed June 3, 1940.

It is an object of my invention to provide a clamping device which permits assembly of the template and die stock with the clamp without separating the parts of the clamp and which therefore does not require the provision of openings or slots in the template for positioning the template with respect to the clamp.

Further objects and advantages of my improvements will be more readily apparent from the following description of a preferred embodiment thereof as disclosed in the attached drawing in which:

Figure 1 is a plan view showing the assembly of the clamp with a template and a piece of die stock which is being bent around the template;

Fig. 2 is a side elevation of the assembly shown in Fig. 1;

Fig. 3 is a side elevation of the clamp but it is partially shown in vertical section;

Fig. 4 is an end view showing the assembly of the clamp with the template and die stock; and Fig. 5 is a detail view of the U-shaped member which serves to connect the parts of the clamp.

It is customary practice to make cutting dies for bending a piece of the die stock to the shape of a template which has been cut to the shape of the article which is to be cut by the die. Such dies must be made substantially accurately to shape, and in my prior application Serial No. 338,539, filed June 3, 1940, I have disclosed a clamp which serves to hold the template in association with the upper edge of the die stock whereby the die stock may be readily bent around the template. In Fig. 1, the template 10 is held in association with the die stock 12 by a clamp comprising the base 14, the head 16 and the connecting member 18. The base part 14 has a clamping face 20 at one end adapted to engage the die stock. The head member 16 is substantially L-shaped and formed with a clamping face 22 opposed to the clamping face 20 whereby the die stock is gripped between the pair of clamping faces 20—22. The template fits between the base 14 and head 16 and abuts against the upper edge 24 of the die stock as shown in Fig. 2. The template is therefore retained between the top face 26 of the base 14 and the bottom face 28 of the head 16. The template is gripped in position by the adjustable screw 30 having a knurled head 32. The screw member 30 is threaded through the head 16 at the opposite end from where the die stock is clamped and may be provided with a point 34 which presses into the template. A detent 36 may be formed in the base 14 beneath the point of the screw.

As previously stated, the base 14 and head 16 are connected by a U-shaped member 18, the legs of which fit into openings 38—40 formed respectively in the head 16 and base 14. In order to hold the U-shaped member against separation from the parts of the clamp, but to permit some pivotal movement between the parts, the connecting member 18 is formed with slots 42—44 and pins 46—48 driven into the head and base to engage the slots. As indicated in Fig. 3, the slots are formed to permit some movement with respect to the pins.

The clamping device disclosed in my prior application above referred to requires cutting of the template either to form a slot at an edge of the template or within the body thereof which engages the connecting element between the base and head of the clamp. The clamp disclosed in this application does not require any openings in the template. One end of the die stock is inserted as shown between the clamping faces 20—22, and the template is slipped into position against the edge 24 of the die stock. The screw member 30 is then tightened against the template while at the same time the clamping faces 20—22 are forced together to grip the die stock. The die stock will then be bent around the template as shown in Fig. 1. It will be understood that the bending may not be completed entirely around the template without moving the clamp, but since the clamp may be quickly secured in place this is not considered objectionable.

I claim:

1. A clamp of the type described comprising an angle element having a clamping face at the interior surface of one arm of the angle element, the other arm having a clamping screw threaded therethrough, a second element providing a clamping face positioned to oppose and cooperate with the first mentioned clamping face, and an additional clamping face cooperating with said clamping screw, a connecting member between said elements secured at its opposite ends to each of said elements with provision for relative movement with respect thereto, said connecting element between the ends thereof extending laterally from the sides of said elements.

2. A clamp for holding die stock in association with a template during bending of the die stock in the manufacture of shoe cutting dies comprising an L-shaped head member and a base block having opposed clamping faces adapted to engage the die stock and the template, said head member and base block having transversely disposed openings therein above and below the faces between which the template is adapted to be engaged, a U-shaped connecting member the legs of which fit into said openings, and a clamping screw threaded into said head member adapted to tighten the clamp on the die stock and template.

3. A clamp for holding die stock in association with a template during bending of the die stock in the manufacture of shoe cutting dies comprising an L-shaped head member and a base block and a U-shaped connecting member, said head and base block having a pair of opposed clamping faces adapted to grip the die stock and a second pair of opposed clamping faces adapted to grip the template whereby the template is held against an edge of the die stock, said connecting member having legs adapted to be received in openings formed in said head and base block parallel to the plane of said clamping faces, means for holding said connecting member against displacement from said head and base block while permitting limited relative movement therebetween, and means for tightening the clamp so as to simultaneously grip the die stock and template.

HARRY M. BOLSTON.